United States Patent
Wendland, Jr.

(10) Patent No.: US 6,381,387 B1
(45) Date of Patent: Apr. 30, 2002

(54) ATHERMALIZATION OF A WAVELENGTH ROUTING ELEMENT

(75) Inventor: Ronald G. Wendland, Jr., Lafayette, CO (US)

(73) Assignee: Networks Photonics, Inc., Boulder, CO (US)

(*) Notice: Subject to any disclaimer, the term of this patent is extended or adjusted under 35 U.S.C. 154(b) by 0 days.

(21) Appl. No.: 09/630,817

(22) Filed: Aug. 2, 2000

(51) Int. Cl.[7] ............................ G02B 6/34; H04J 14/02
(52) U.S. Cl. ........................... 385/37; 385/15; 385/24; 385/31; 385/33; 385/47; 359/127; 359/124; 359/130
(58) Field of Search ............................ 385/15, 16, 17, 385/31, 33, 37, 24, 47, 27, 28, 11, 14; 359/127, 124, 130

(56) References Cited

U.S. PATENT DOCUMENTS

| | | | |
|---|---|---|---|
| 4,362,359 A | * 12/1982 | Dammann et al. | 385/37 X |
| 5,270,870 A | 12/1993 | O'Brien et al. | 359/820 |
| 5,283,695 A | 2/1994 | Ziph-Schatzberg et al. | 359/820 |
| 5,414,540 A | 5/1995 | Patel et al. | 359/94 |
| 5,691,847 A | 11/1997 | Chen | 359/565 |
| 5,706,375 A | * 1/1998 | Mihailov et al. | 385/24 |
| 5,745,289 A | 4/1998 | Hamblen | 359/565 |
| 5,748,815 A | * 5/1998 | Hamel et al. | 385/37 |
| 5,812,716 A | * 9/1998 | Ohishi | 385/92 |
| 5,917,625 A | 6/1999 | Ogusu | 359/130 |
| 6,023,544 A | 2/2000 | Dragone | 385/37 |
| 6,040,950 A | 3/2000 | Broome | 359/820 |
| 6,044,189 A | * 3/2000 | Miller | 385/37 |
| 6,087,280 A | * 7/2000 | Beall et al. | 501/7 |
| 6,101,301 A | * 8/2000 | Engelberth et al. | 385/37 |
| 6,201,909 B1 | * 3/2001 | Kewitsch et al. | 385/37 |
| 6,263,127 B1 | * 7/2001 | Dragone et al. | 385/24 |
| 6,269,208 B1 | * 7/2001 | Bhatia et al. | 385/37 |
| 6,278,810 B1 | * 8/2001 | Sirkis et al. | 385/12 |
| 6,282,337 B1 | * 8/2001 | Horwitz et al. | 385/24 |
| 6,295,399 B1 | * 9/2001 | Engelberth | 385/37 |

OTHER PUBLICATIONS

Nishi, I. et al., "Broad passband–width optical filter for multi/demultiplexer usinga diffraction grating and a retroreflector prism," Electronic Letters vol. 21, No. 10, May 9, 1985.

Philippe, P. et al., "Wavelength demultiplexer: using echelette gratings on silicon substrate," Applied Optics vol. 24 No. 7, Apr. 1, 1995.

Sun, Z.J. et al., "Demultiplexer with 120 Channels and 0.290–nm channel spacing," IEE Photonics Technology Letters, vol. 10, No. 1, Jan. 1998.

"Low Voltage Piezoelectric Stacks," Transducer Elements, Catalog #3, 1998, pp. 30–45, Piezo Systems, Inc., Cambridge, MA 02139.

* cited by examiner

*Primary Examiner*—Brian Healy
(74) *Attorney, Agent, or Firm*—Townsend and Townsend and Crew LLP (57) ABSTRACT

An athermalized wavelength router comprises a base, a fiber optic input and output component, a routing array having a plurality of reflectors and a routing array/input and output mount that mounts the routing array and the input and output component to the base. The router further includes a grating and a grating mount that mounts the grating to the base. A lens is positioned between the input and output component and the grating. The base, the routing array/input and output mount and the grating mount are configured to maintain a generally constant focal length and a pointing angle onto the routing array as the temperature of the router changes.

16 Claims, 6 Drawing Sheets

ATHERMALIZATION OF A WAVELENGTH ROUTING ELEMENT

BACKGROUND OF THE INVENTION

This invention relates generally to the field of athermalization, and in particular to the athermalization of fiber-optic communications systems. More specifically, the invention relates to the athermalization of a wavelength router.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However SONET/SDH systems are designed to process only a single optical channel. Multi-wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

In order to perform wavelength routing functions optically today, the light stream must first be de-multiplexed or filtered into its many individual wavelengths, each on an individual optical fiber. Then each individual wavelength must be directed toward its target fiber using a large array of optical switches commonly called as optical cross-connect (OXC). Finally, all of the wavelengths must be re-multiplexed before continuing on through the destination fiber. This compound process is complex, very expensive, decreases system reliability and complicates system management. The OXC in particular is a technical challenge. A typical 40–80 channel DWDM system will require thousands of switches to fully cross-connect all the wavelengths. Opto-mechanical switches, which offer acceptable optical specifications are too big, expensive and unreliable for widespread deployment. New integrated solid-state technologies based on new materials are being researched, but are still far from commercial application.

Exemplary wavelength routers are described in co-pending U.S. patent application Ser. No. 09/422,061, filed Nov. 16, 1999, pending, the complete disclosure of which is herein incorporated by reference. Such wavelength routers allow for flexible and effective routing of spectral bands between an input port and a set of output ports and vice versa.

One factor to consider when designing wavelength routers is the environment in which the routers are to be used. For example, wavelength routers may possibly experience temperature changes of up to about 55° C. As a result, some of the components of the router may change in size, thereby affecting the operation of the router. For instance, such temperature changes may affect the focal length of the router and/or cause signals to drift off targets within the router.

Hence, this invention is related to techniques for athermalizing wavelength routers. In this way, the wavelength routes may successfully be used in a wide variety of environments.

SUMMARY OF THE INVENTION

The invention provides for the athermalization of wavelength routers so that the wavelength routers may acceptably operate within environments where the temperature varies. In one embodiment, a wavelength router comprises a base, a fiber optic input and output (FIO) component, a micro routing array (MRA) having a plurality of reflectors, and a MRA/FIO mount that mounts the MRA and the FIO component to the base. The router further comprises a grating and a grating mount that mounts the grating to the base at a location spaced apart from the FIO component and the MRA. At least one lens is positioned between the grating and both the MRA and the FIO component through which signals are transmitted. The base, the MRA/FIO mount and the grating mount are constructed of materials that expand and contract in a coordinated fashion when subjected to temperature changes such that a generally constant distance is maintained between the lens and the MRA/FIO mount. In this way, the focal length of the router remains essentially unchanged as the temperature of the router is changed. Further, the materials used in constructing the routers are configured to orient the grating relative to the routing array during temperature changes such that signals reflected from the grating are pointed toward the routing array.

To accomplish such features, the base may be constructed from a material such as Invar 36. The MRA/FIO mount may be constructed of a material such as titanium. Further, the grating mount may be constructed of a material such as titanium.

To maintain the generally constant focal length, the base may be provided with a coefficient of thermal expansion, $CTE_{BP}$, that is less than the coefficient of thermal expansion of the MRA/FIO mount, $CTE_M$. Further, if the MRA/FIO mount and the lens are spaced apart along a Z axis of the base, $CTE_{BP}$ and $CTE_M$ may be selected such that $0 = L_M \cdot (CTE_{BP} + CTE_M + F_L \cdot CTE_{BP})$, where $L_M$ is the length of the MRA/FIO mount along the Z axis, and $F_L$ is the focal length.

In another aspect, proper pointing may be accomplished by providing the grating mount with a face and a pair of legs. Further, one of the legs has a length that is longer than the other leg so that the face will reorient itself as the two legs expand and contract differently.

The invention further provides a method for routing signals using such a router. According to the method, a first signal is passed from an input of the FIO component, through the lens and onto the grating. The signal is reflected back through the lens and to the FIO component. The temperature of the router is subsequently changed and another signal is routed in a manner similar to the first signal. However, at the second temperature the base, the MRA/FIO mount and the grating mount have lengths that are different than when at the first temperature. Even so, the router is constructed such that the focal length and the routing angle remain generally constant at both temperatures.

The focal length and the point angle are maintained generally constant by constructing the base, MRA/FIO mount and grating mount of materials that are configured to expand or contract in a coordinated manner as the temperature changes. In this way, the focal length and point angle may be kept generally constant for temperatures ranging from about 0° C. to about 55° C.

DESCRIPTION OF THE SPECIFIC EMBODIMENTS

The invention provides for the athermalization of wavelength routers to permit the wavelength routers to be operated within a wide variety of thermally dynamic environments. For example, the wavelength routers may be successfully operated in environments where the temperature ranges from about 0° C. to about 55° C.

The general functionality of a wavelength router is to accept light having a plurality of (say N) spectral bands at an input port, and selectively direct subsets of the spectral bands to desired ones of a plurality of (say M) output ports. The routers may include dynamic (switching) where the routing mechanism includes one or more routing elements whose state can be dynamically changed in the field to effect switching. The routers may also include static embodiments in which the routing elements are configured at the time of manufacture or under circumstances where the configuration is intended to remain unchanged during prolonged periods of normal operation.

The routers may include a dispersive element, such as a diffraction grating or a prism, which operates to deflect incoming light by a wavelength-dependent amount. Different portions of the deflected light are intercepted by different routing elements. Although the incoming light could have a continuous spectrum, adjacent segments of which could be considered different spectral bands, it is generally contemplated that the spectrum of the incoming light will have a plurality of spaced bands.

The terms "input port" and "output port" are intended to have broad meanings. At the broadest, a port is defined by a point where light enters or leaves the system. For example, the input (or output) port could be the location of a light source (or detector) or the location of the downstream end of an input fiber (or the upstream end of an output fiber). In specific embodiments, the structure at the port location could include a fiber connector to receive the fiber, or could include the end of a fiber pigtail, the other end of which is connected to outside components. In many cases, light will diverge as it enters the wavelength router after passing through the input port, and will converge within the wavelength router as it approaches the output port. However, this is not necessary.

The International Telecommunications Union (ITU) has defined a standard wavelength grid having a frequency band centered at 193,100 GHz, and another band at every 100 GHz interval around 193,100 GHz. This corresponds to a wavelength spacing of approximately 0.8 nm around a center wavelength of approximately 1550 nm, it being understood that the grid is uniform in frequency and only approximately uniform in wavelength. Embodiments of the invention are preferably designed for the ITU grid, but finer frequency intervals of 25 GHz and 50 GHz (corresponding to wavelength spacings of approximately 0.2 nm and 0.4 nm) are also of interest.

According to the invention, athermalization techniques are applied to such wavelength routers so that signals may be accurately routed as the various components of the wavelength router expand or contract as their temperature changes. Athermalization is a technique used to reduce or eliminate thermal distortions and pointing misalignment in systems to increase the functional temperature range. Athermalization is accomplished through the use of materials with differing expansion rates and appropriate geometry. The result is lower expansions than any of the constituent materials.

Athermalization is a passive approach to thermal compensation as opposed to active techniques involving heaters and controllers used to maintain temperatures and thus limit thermal distortions. Additionally, athermalization can lessen the need for exotic materials which are often prohibitively expensive. Exotic materials include those materials having a near "zero" coefficient of thermal expansion, such as graphite composites, ceramics, special metal alloys and low expansion glasses. In addition to cost, processing difficulties also limit the usefulness of this category of materials in commercial applications. Examples of non-exotic materials that may be used when athermalizing the wavelength routers of the invention include stainless steel, titanium, aluminum, Invar, and the like.

According to the invention, certain critical components of the wavelength routers are specially shaped and are constructed of materials which are designed to expand and contract in such a manner that proper signed routing is maintained. In this way, expansion and contraction of the components is coordinated to compensate for thermal variations. Such athermalization techniques may be incorporated into essentially any type of wavelength router, including, but not limited to, those described in copending U.S. patent application Ser. No. 09/422,061, pending previously incorporated by reference. Further, the athermalization techniques may be used with both single and dual pass type wavelength routers.

Figure 1A:
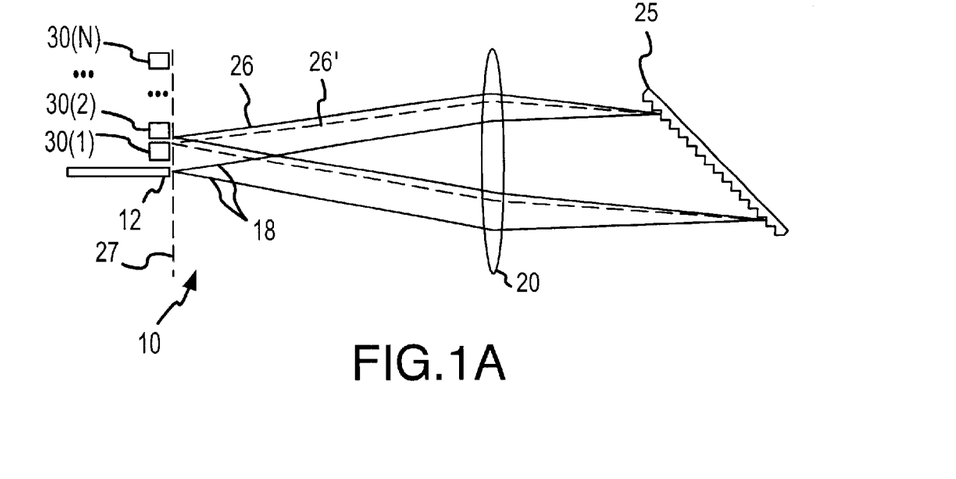
FIGS. 1A, 1B and 1C are schematic top, side and end views, respectively, of a wavelength router according to an embodiment of the invention.
Figure 1B:
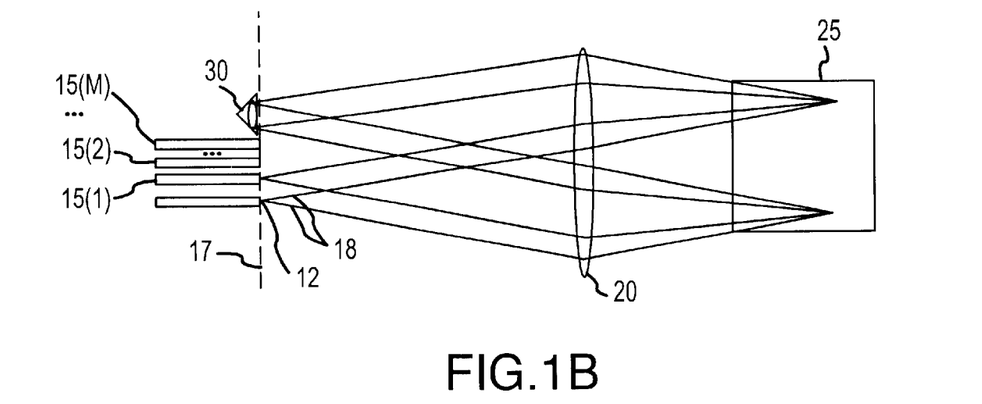
Figure 1C:
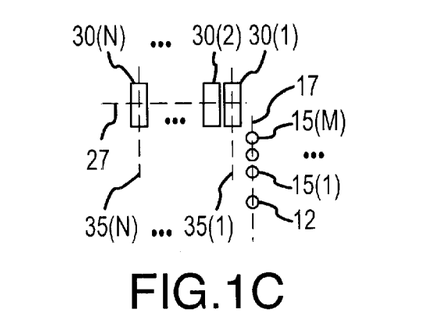

One particular embodiment of a wavelength router 10 is illustrated in FIGS. 1A, 1B and 1C. This embodiment is included to illustrate the basic principals of operation of one type of wavelength router as described generally in copending U.S. application Ser. No. 09/422,061, pending previously incorporated by reference. However, as described above, the invention is not intended to be limited only to such an embodiment.

FIGS. 1A, 1B, and 1C are schematic top, side, and end views, respectively, of a wavelength router 10. The general functionality of wavelength router 10 is to accept light having a plurality of (say N) spectral bands at an input port 12, and selectively direct subsets of the spectral bands to desired ones of a plurality of (say M) output ports, designated 15(1 ... M). The output ports are shown in the end view of FIG. 1C as disposed along a line 17 that extends generally perpendicular to the top view of FIG. 1A. The input and output ports are shown as communicating with respective input and output optical fibers, but it should be understood that the input port could also receive light directly from a light source, and the output ports could be coupled directly to optical detectors. The drawing is not to scale.

Light entering wavelength router 10 from input port 12 forms a diverging beam 18, which includes the different spectral bands. Beam 18 encounters a lens 20 which collimates the light and directs it to a reflective diffraction grating 25. Grating 25 disperses the light so that collimated beams at different wavelengths are directed at different angles back towards lens 20. Two such beams are shown explicitly and denoted 26 and 26' (the latter drawn in dashed lines). Since these collimated beams encounter the lens at different angles, they are focused at different points along a line 27 in a transverse focal plane. Line 27 extends in the plane of the top view of FIG. 1A.

The focused beams encounter respective ones of plurality of retroreflectors, designated 30(1 ... N), located near the focal plane. The beams are directed, as diverging beams, back to lens 20. As will be described in detail below, each retroreflector sends its intercepted beam along a reverse path that may be displaced in a direction perpendicular to line 27. More specifically, the beams are displaced along respective lines 35(1 ... N) that extend generally parallel to line 17 in the plane of the side view of FIG. 1B and the end view of FIG. 1C.

In the particular embodiment shown, the displacement of each beam is effected by moving the position of the retroreflector along its respective line 35(i). In other embodiments, to be described below, the beam displacement is effected by a reconfiguration of the retroreflector. It is noted that the retroreflectors are shown above the output ports in the plane of FIG. 1C, but this is not necessary; other relative positions may occur for different orientations of the grating or other elements.

The beams returning from the retroreflectors are collimated by lens 20 and directed once more to grating 25. Grating 25, on the second encounter, removes the angular separation between the different beams, and directs the collimated beams back to lens 20, which focuses the beams. However, due to the possible displacement of each beam by its respective retroreflector, the beams will be focused at possibly different points along line 17. Thus, depending on the positions of the retroreflectors, each beam is directed to one or another of output ports 15(1 ... M).

In sum, each spectral band is collimated, encounters the grating and leaves the grating at a wavelength-dependent angle, is focused on its respective retroreflector such that is displaced by a desired amount determined by the retroreflector, is collimated again, encounters the grating again so that the grating undoes the previous dispersion, and is focused on the output port that corresponds to the displacement imposed by the retroreflector. In the embodiment described above, the light traverses the region between the ports and the grating four times, twice in each direction.

Figure 2:
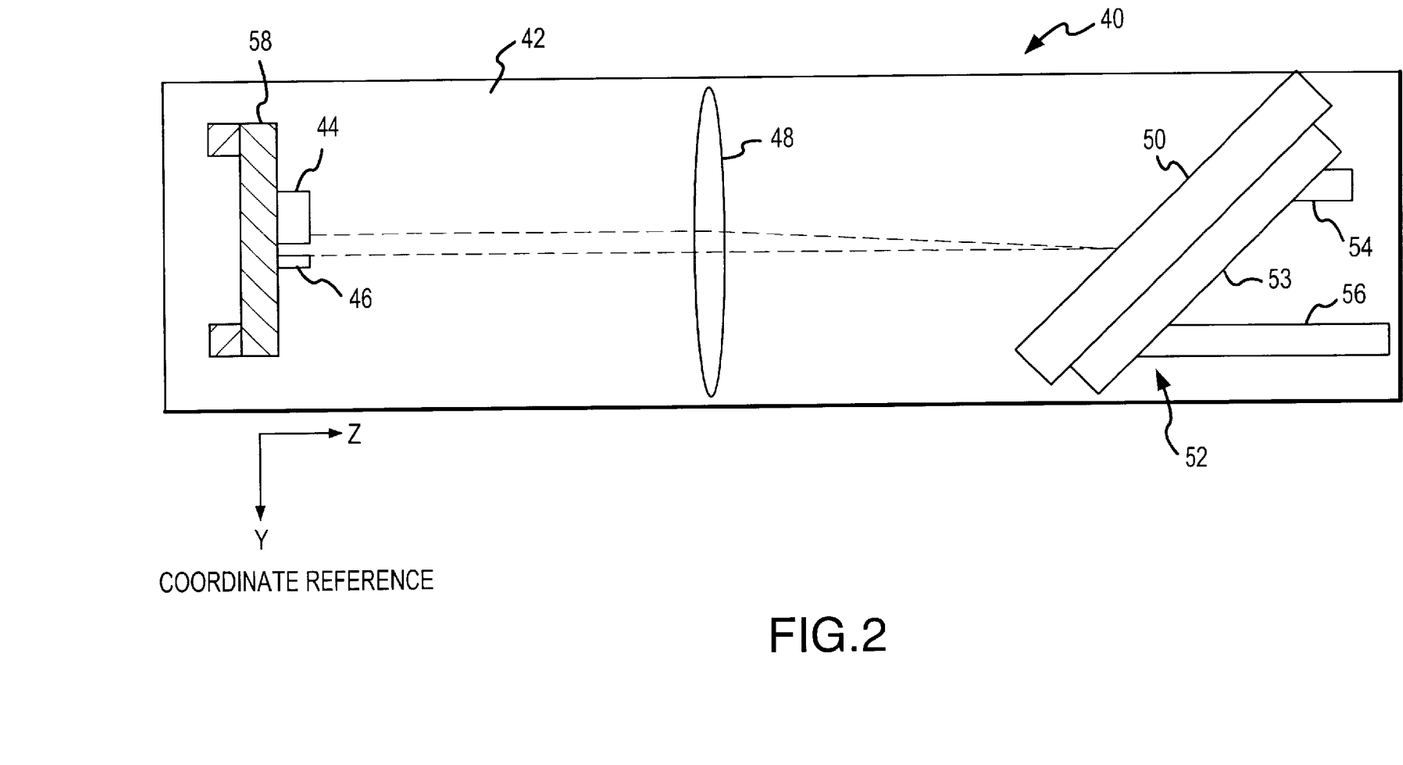
FIG. 2 is a schematic view of an embodiment of an athermalized wavelength router according to the invention.

FIG. 2 is a schematic diagram of a wavelength router 40 which operates in a manner similar to wavelength router 10 of FIG. 1. Further, wavelength router 40 has been athermalized to compensate for changing temperatures. Wavelength router 40 comprises a base plate 42 that is constructed of a material of a known thermal expansion. Base plate 42 provides a mounting base for the other components of the router. Router 40 further includes a micro routing array (MRA) 44 and a fiber optic input and output (FIO) 46. Spaced from MRA 44 and FIO 46 along a Z axis is a lens 48 having a certain focal length. Alternatively, a system of lenses having a given focal length may be used. Spaced from lens 48 along the Z axis is a reflective diffracting grating 50. A grating mount 52 mounts grating 50 above base plate 42. Grating mount 52 is constructed of a material having a Coefficient of Thermal Expansion (CTE) that is different from base plate 42. Further, grating mount 52 includes a face 53 and a pair of legs 54 and 56 that connect grating 50 to base plate 42. Legs 54 and 56 are different in length.

A MRA/FIO mount 58 mounts MRA 44 and FIO 46 above base plate 42. MRA/FIO mount 58 is constructed of a material with a CTE that is different than that of base plate 42. Dashed lines 60 and 62 represent optical paths between FIO 42 and MRA 44 through reflection off grating 50.

Wavelength router 40 is constructed so that a generally constant distance is maintained between lens 48 and MRA/FIO mount 58 throughout a wide thermodynamic range. Further, the pointing angle between grating 50 and MRA 44 is maintained generally constant within the same temperature range. In this way, wavelength router 40 is athermalized.

Figure 3:
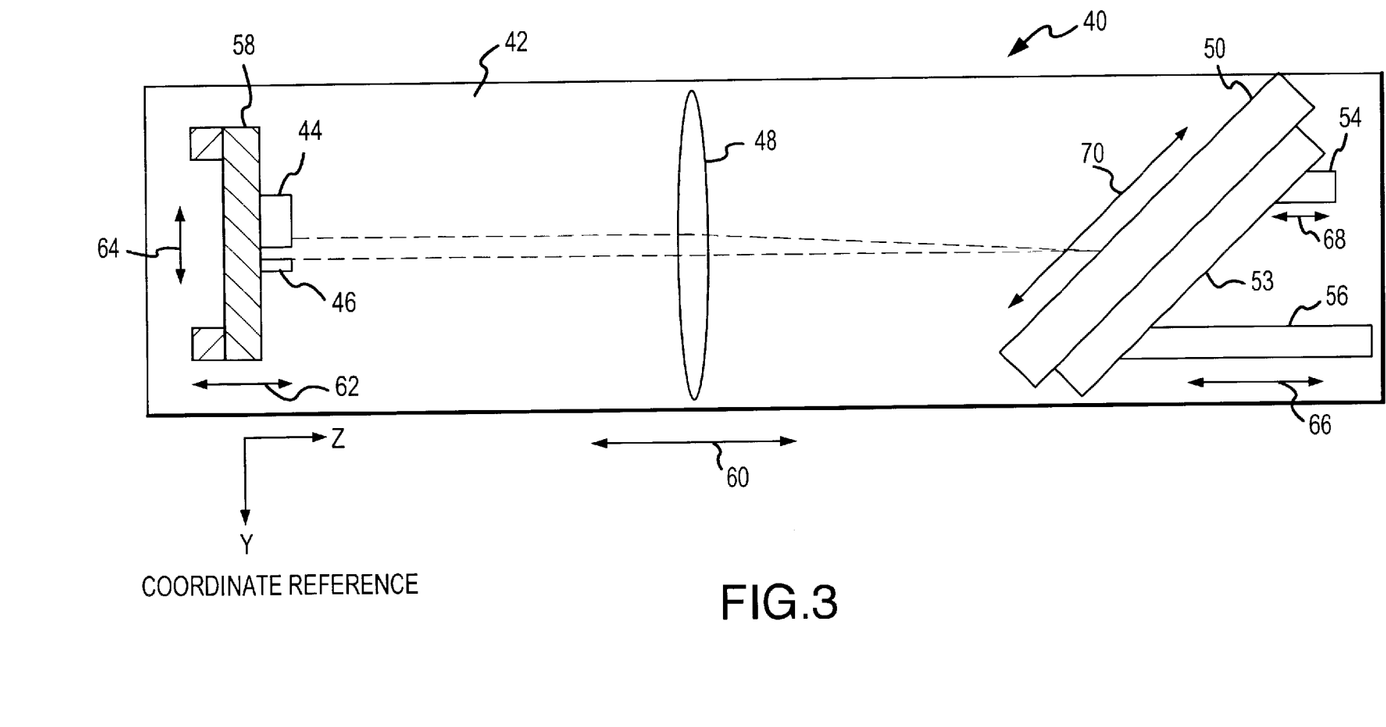
FIG. 3 illustrates the wavelength router of FIG. 2 and certain thermal expansions/contractions that occur in the wavelength router.

Referring now to FIG. 3, the athermalization process will be described in greater detail. In FIG. 3, arrow 60 represents the expansion and contraction of base plate 40 in the Z direction. Such movement changes the distance between lens 48 and both MRA 44 and FIO 42. Arrow 62 represents the expansion and contraction of MRA/FIO mount 58 in the Z direction. Such movement in the Z direction is used to cancel out the expansion or contraction of base plate 42 in the Z direction to maintain the focus of router 40. MRA/FIO mount 58 has a higher CTE than base plate 42 and is attached in such a manner that it counteracts expansion/contraction of base plate 42. The CTE of baseplate 42 and MRA/FIO mount 58 may be selected according to equation (1):

$$0 = L_M \cdot (CTE_{BP} - CTE_M) + F_L \cdot CTE_{BP} \quad (1)$$

where $CTE_{BP}$ and $F_L$ are the CTE of base plate 42 and the focal length of lens 48. ($CTE_M$ and $L_M$ are the CTE of MRA/FIO mount 58 and the length of MRA/FIO mount 58 in the Z direction.

Hence, by selecting appropriate materials for base plate 42 and MRA/FIO mount 58, the focal length of lens 48 may be maintained generally constant. Merely by way of example, when lens 48 has a focal length of 100 mm and the length of MRA/FIO mount in the Z direction is 12.6 mm, base plate 42 may be constructed of Invar 36 and MRA/FIO mount 58 may be constructed of titanium.

Arrow 64 represents the changing distance between MRA 44 and FIO 46 in the Y direction when experiencing temperature changes. When changing direction in such a manner, wavelengths may drift off the intended targets on MRA 44. To compensate for this effect, router 40 is athermalized to repoint grating 50 so that the reflected wavelengths reach their intended targets on MRA 44. Grating 50 is repainted by the expansion/contraction differential resulting from the difference in the lengths of legs 54 and 56 of grating mount 52 as represented by arrows 66 and 68.

Figure 4:
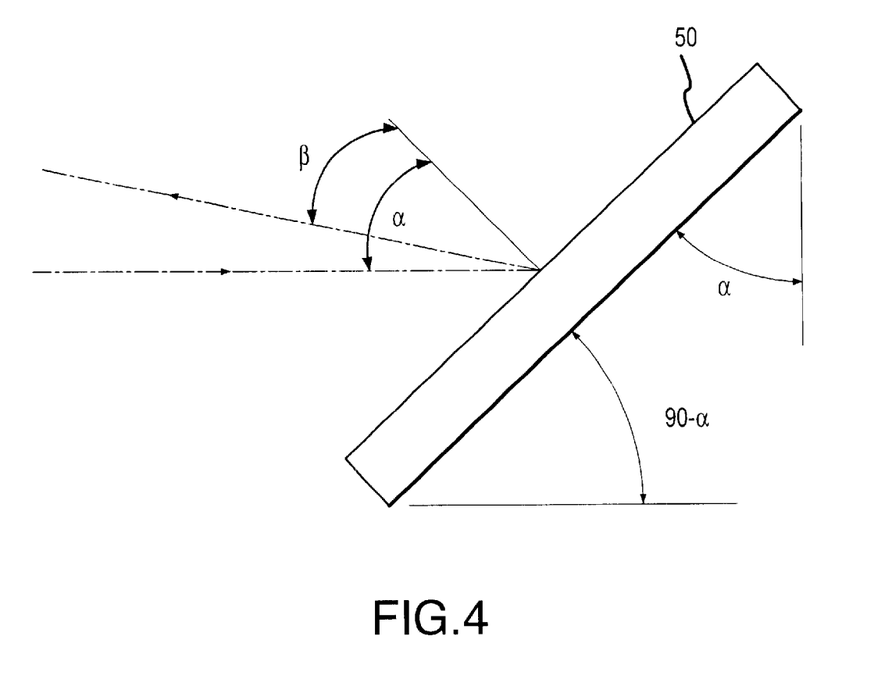
FIG. 4 is a schematic diagram illustrating the relationship between the grating normal, angles α and β, and the mount angle (90-α) of the wavelength router of FIG. 2.

More specifically, as shown in FIG. 4, an incident wave front angle a, with respect to the grating normal, is related to a diffracted wavefront angle β by equation (2):

$$m\lambda = d(\sin \alpha + \sin \beta) \quad (2)$$

where m is the grating order, λ is the wavelength, and d is the groove spacing. The groove spacing, d, is the distance between grooves in a diffraction grating and changes as a function of temperature change by the following: $d(\Delta T) = d + d \cdot CTE_{grating} \cdot \Delta T$. FIG. 4 illustrates the relationship between the grating normal and α and β and the angle mount (90-α). The incident wavefront angle α changes as the mount angle changes with temperature. Equation (3) represents the change in α due to temperature:

$$\alpha(\Delta T) = \arctan\left[\frac{L_4 - (L_1 - L_4 - L_2) \cdot CTE_{BP} \cdot \Delta T + (L_1 - L_2)CTE_M \cdot \Delta T}{L_5 + L_3 \cdot CTE_{BP} \cdot \Delta T}\right]$$

Figure 5:
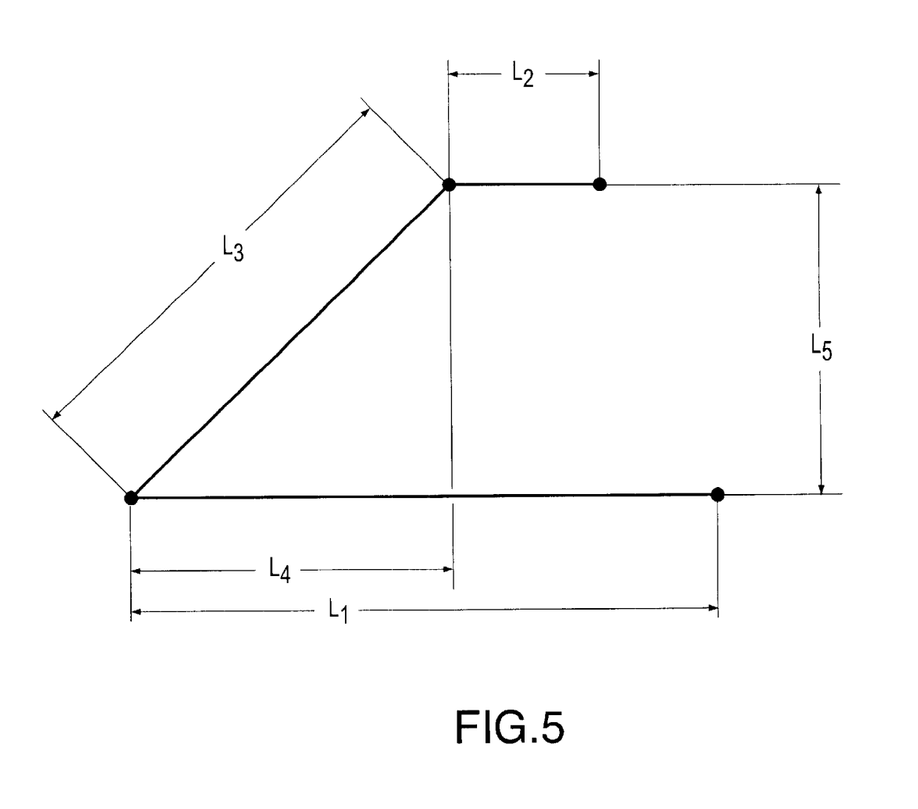
FIG. 5 is a schematic diagram illustrating certain length variables of the wavelength router of FIG. 2.

FIG. 5 in combination with FIG. 3 illustrates the various length variables ($L_n$) of equation (3). Length $L_1$ is the length of leg 56 and length $L_2$ is the length of leg 54. Length $L_3$ is the length of grating 50, and length $L_4$ is $L_3 \times \sin(\alpha)$. Further, $CTE_{BP}$ is the CTE of baseplate 42 and $CTE_M$ is the CTE of grating mount 52. The other factor that affects β and changes with temperature is groove spacing, d. As grating 50 expands or contracts (as illustrated by arrow 70 in FIG. 3), the groove spacing increases or decreases, respectively. Knowing α (ΔT) and d(ΔT), β(ΔT) can be calculated using equation (2).

The change in β translates to positional change at MRA when it passes through lens 48 by equation (4):

$$\Delta Y = F_L \cdot \sin(\theta) \quad (4)$$

where ΔY is the positioned change in Y, $F_L$ is the focal length of lens 42 and θ is the angle between the optical axis of lens 42 and the diffracted wavefront. For wavelength router 40, θ=α-β. By equating equation 4 to the Y expansion between FIO 46 and MRA 44, pointing onto MRA 44 may be maintained. Equation (5) illustrates this relationship:

$$F_L \cdot \sin(\alpha(\Delta T) - \beta(\Delta T)) = L_{FIO to MRA} \cdot CTE_M \cdot \Delta T \quad (5)$$

where $L_{FIO\ to\ MRA}$ is the distance in Y between FIO 46 and MRA 44, $CTE_M$ is the CTE of MRA/FIO mount 58, and ΔT is the temperature change.

Hence, by appropriately configuring wavelength router 40, proper pointing of signals onto MRA 44 may occur. As an example of implementing this technique to maintain pointing at the MRA: assume a WRE base plate of Invar 36 and a grating mount composed of titanium and a grating of Ultra Low Expansion (ULE) glass ceramic. The grating order (m) is 9, examining a wavelength of 1550 nanometers, and an initial grating groove spacing (d) of 1.053e-5 meters. The initial α angle is 42° yielding an initial β angle of 41°. The FL of the lens is 100 mm. In order to maintain pointing to well below the submicron level the specific geometry of the grating mount is as follows:

L1=45.00 mm
L2=11.11 mm
L3=50.00 mm
L4=33.50 mm
L5=37.20 mm

Figure 6:
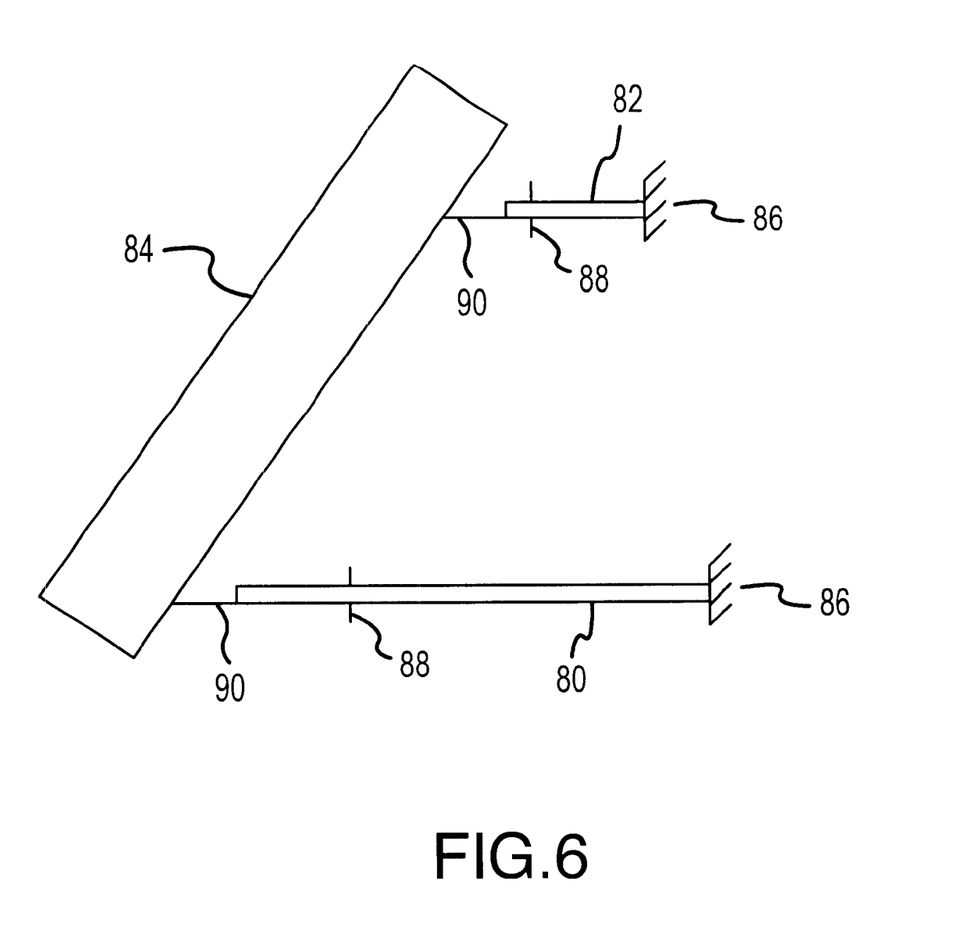
FIG. 6 is a specific implementation of a grating mount.

For this specific case a pointing displacement due to temperature change is maintained within 2.0e-11 meters. A specific implementation of the grating mount is shown in FIG. 6. In FIG. 6, elements 80 and 82 are the two mount legs L1 and L2, element 84 is the grating, element 86 represents fixed mounting of the grating to the base plate, elements 88 are blade flexures between the mount legs and the base plate, and elements 90 are blade flexures between the mount legs and the grating. The purpose of the blade flexures 88 is to provide structural stability to the mount while not constraining the thermal expansion of the mount legs. The blade flexures 90 provide the attachment between the grating and the mount legs and allows for the relative rotation between the grating and the mount legs. This provides the necessary degree of freedom release such that the grating angle change can occur. Other approaches such as a ball and socket joint could be used to provide the same result.

The invention has now been described in detail for purposes of clarity and understanding. However, it will be appreciated that certain changes and modifications may be practiced within the scope of the appended claims.

What is claimed is:

1. A wavelength router, comprising:
   a base;
   a fiber optic input and output component;
   a routing array having a plurality of reflectors;
   a routing array/input and output mount that mounts the routing array and the input and output component to the base;
   a grating;
   a grating mount that mounts the grating to the base at a location spaced apart from the input and output component and the routing array; and
   at least one lens positioned between the grating and the routing array and between the grating and the input and output component through which signals are transmitted;
   wherein the base, the routing array/input and output mount and the grating mount are configured to maintain a generally constant distance between the lens and the routing array/input and output mount and to orient the grating relative to the routing array such that signals reflected from the grating are pointed toward the routing array when the temperature of the wavelength router changes.

2. A router as in claim 1, wherein the base is constructed of materials selected from a group consisting of Invar, fused silica, or stainless steel, and wherein the routing array/input and output mount is constructed of materials selected from a group consisting of titanium, aluminum, or stainless steel.

3. A router as in claim 2, wherein the grating mount is constructed of materials selected from a group consisting of titanium, aluminum, or thermo plastic.

4. A router as in claim 1, wherein the base has a coefficient of thermal expansion $CTE_{BP}$, and wherein the routing array/input and output mount has a coefficient of thermal expansion $CTE_M$, and wherein $CTE_M$ is greater than $CTE_{BP}$.

5. A router as in claim 4, wherein the routing array/input and output mount is spaced apart from the lens along a Z axis, wherein the routing array/input and output mount has a length $L_M$ in the Z axis, wherein the lens has a focal length $F_L$, and wherein $CTE_M$, $CTE_{BP}$, $L_M$ and $F_L$ are selected such that $$O = L_M \cdot (CTE_{BP} - CTE_M) + F_L \cdot CTE_{BP}.$$

6. A router as in claim 1, wherein the grating mount comprises a face to which the grating is mounted, and a pair of legs extending from the face, wherein one of the legs has a length $L_1$, wherein the other leg has a length $L_2$, and wherein $L_1$ is greater than $L_2$.

7. A wavelength router comprising:
   a base;
   a fiber optic input and output component;
   a routing array having a plurality of reflectors;
   a routing array/input and output mount that mounts the routing array and the input and output component to the base;
   a grating operably coupled to the base at a location spaced apart from the input and output component and the routing array;
   at least one lens positioned between the grating and the routing array and between the grating and the input and output component through which signals are transmitted;
   wherein the base and the routing array/input and output mount are configured to maintain a generally constant distance between the lens and the routing array/input and output mount when the temperature of the wavelength router changes.

8. A router as in claim 7, wherein the base is constructed of materials selected from a group consisting of Invar, fused silica, or stainless steel, and wherein the routing array/input and output mount is constructed of materials selected from a group consisting of titanium, aluminum, or thermo plastics.

9. A router as in claim 7, wherein the base has a coefficient of thermal expansion $CTE_{BP}$, and wherein the routing array/input and output mount has a coefficient of thermal expansion $CTE_M$, and wherein $CTE_M$ is greater than $CTE_{BP}$.

10. A router as in claim 9, wherein the routing array/input and output mount is spaced apart from the lens along a Z axis, wherein the routing array/input and output mount has a length $L_M$ in the Z axis, wherein the lens has a focal length $F_L$, and wherein $CTE_M$, $CTE_{BP}$, $L_M$ and $F_L$ are selected such that $$O = L_M \cdot (CTE_{BP} - CTE_M) + F_L \cdot CTE_{BP}.$$

11. A wavelength router, comprising:
    a base;
    a fiber optic input and output component;
    a routing array having a plurality of reflectors, wherein the fiber optic input and output component and the routing array are operably coupled to the base;
    a grating;
    a grating mount that mounts the grating to the base at a location spaced apart from the input and output component and the routing array; and
    at least one lens positioned between the grating and the routing array and between the grating and the input and output component through which signals are transmitted;
    wherein the base and the grating mount are configured to orient the grating relative to the routing array such that signals reflected from the grating are pointed toward the routing array when the temperature of the wavelength router changes.

12. A router as in claim 11, wherein the base is constructed from materials selected from a group consisting of Invar, fused silicon, or stainless steel, and wherein the grating mount is constructed of materials selected from a group consisting of titanium, aluminum, or thermo plastic.

13. A router as in claim 11, wherein the grating mount comprises a face to which the grating is mounted, and a pair of legs extending from the face, wherein one of the legs has a length $L_1$, wherein the other leg has a length $L_2$, and wherein $L_1$ is greater than $L_2$.

14. A method for routing signals, the method comprising:
    providing a wavelength router comprising a base, a fiber optic input and output component, a routing array having a plurality of reflectors, a routing array/input and output mount that mounts the routing array and the input and output component to the base, a grating, a grating mount that mounts the grating to the base at a location spaced apart from the input and output component and the routing array, and at least one lens positioned between the grating and the routing array and between the grating and the input and output component through which signals are transmitted, wherein router has a certain focal length and a certain pointing angle between the routing array and the grating;
    passing a first signal from an input of the fiber optic input and output component, through the lens and onto the grating where the first signal is reflected back through the lens and onto the routing array while the router is at a first temperature;
    passing a second signal through the router while the router is at a second temperature, wherein at the second temperature the base, the routing array/input and output mount, and the grating mount have a different length than at the first temperature, and further comprising maintaining the focal length and the routing angle generally constant while at the first temperature and the second temperature.

15. A method as in claim 14, wherein the maintaining step comprises constructing, the base, the routing array/input and output mount and the grating mount of materials having a certain size, shape and coefficient of thermal expansion so that the change of temperature does not affect the focal length or the point angle.

16. A method in claim 14, wherein the difference between the first and the second temperatures is in the range from about 0° C. to about 55° C.

* * * * *